United States Patent [19]

Grube et al.

[11] 4,444,916
[45] Apr. 24, 1984

[54] POLYISOCYANURATE FOAM AND REACTION MIXTURE FOR MAKING SAME

[75] Inventors: Louis L. Grube, Bound Brook; Charles J. Horner, Jr., Piscataway, both of N.J.

[73] Assignee: GAF Corporation, New York, N.Y.

[21] Appl. No.: 519,276

[22] Filed: Aug. 1, 1983

[51] Int. Cl.³ ............................................. C08G 18/14
[52] U.S. Cl. .................................. 521/131; 252/182; 521/167; 521/173
[58] Field of Search ...................... 521/131, 167, 173; 252/182

[56] References Cited

U.S. PATENT DOCUMENTS 3,647,759  3/1972  Walker ................................. 528/305
4,237,238  12/1980  DeGuiseppi et al. ............... 521/131
4,339,343  7/1982  Koehler et al. ...................... 521/131

OTHER PUBLICATIONS

Hughes et al., J. Cellular Plastics, May/Jun., 1980, pp. 152-158.

Primary Examiner—Maurice J. Welsh
Attorney, Agent, or Firm—Joshua J. Ward; J. Gary Mohr

[57] ABSTRACT

Polyisocyanurate foam in which the polyol content is largely a polyol mixture prepared by the transesterification wtih a glycol of a residue obtained from the manufacture of dimethyl terephthalate and in which the foam has been prepared using fluorocarbon blowing agent and amide diol to improve compatibility between the polyol and the blowing agent.

20 Claims, No Drawings

POLYISOCYANURATE FOAM AND REACTION MIXTURE FOR MAKING SAME

BACKGROUND OF THE INVENTION

U.S. Pat. No. 4,237,238 describes improved polyisocyanurate foam obtained by bringing together in the presence of a blowing agent and trimerization catalyst an organic polyisocyanate and a polyol mixture prepared by the transesterification, with a glycol of molecular weight from about 60 to about 400, of a residue obtained from the manufacture of dimethyl terephthalate. Polyol mixtures of this type are described in greater detail in U.S. Pat. No. 3,647,759 and are available commercially from Hercules, Inc., Wilmington, Del. under the tradename Terate ® Resins.

The foams described in U.S. Pat. No. 4,237,238 are said to be characterized by a high degree of fire resistance with low smoke evolution on combustion and low foam friability. Unfortunately, polyols of the type described in U.S. Pat. No. 4,237,238 have poor compatibility with the fluorocarbon blowing agents, especially monofluorotrichloromethane, which are generally preferred in the industry for use in making rigid polyurethane and polyisocyanurate foams. To deal successfully with this poor compatibility it has frequently been necessary to introduce the blowing agent by separate stream (which is relatively inefficient since it allows blowing agent to at least partially separate prior to foaming) or to mix polyols of the type described above with other polyols to improve the overall compatibility of the polyol mixture with the blowing agent. It has also been indicated in the literature that methoxylated nonylphenyl surfactant is effective in improving compatibility between fluorocarbon blowing agents and polyols of the type described above (journal of cellular plastics May/June 1980 page 52-158). There is, however, a need for more effective improvement in compatibility than is afforded by such nonylphenyl surfactants.

U.S. Pat. No. 4,339,343 discloses miscible blends of 20-85% alkoxylated alkyl amines with 15-80% primary hydroxyl polyols and fluorocarbon blowing agent, but does not contemplate the use of the special type of polyols described in U.S. Pat. Nos. 4,237,238 and 3,647,759.

SUMMARY OF THE INVENTION

In accordance with the present invention it has now been found that compatibility of fluorocarbon blowing agents with the type of polyols described in U.S. Pat. Nos. 4,339,238 and 3,647,759 is substantially improved by use of small amounts of amine diol of the general type disclosed in U.S. Pat. No. 4,246,364. By using amide diol as described herein, compatibility between the polyols and fluorocarbon blowing agents is sufficiently improved so that normal production techniques may be employed in manufacturing rigid polyisocyanurate foam where between about 60% and 100 wt % of the polyol is of the type described above. This allows full advantage to be taken of the tendency of this type of polyol to produce rigid foams of low friability, K factor, flammability and cost.

The invention includes rigid cellular polyisocyanurate foam and reaction mixture suitable for making rigid foam. The rigid foam of the invention comprises the post cured reaction product of reacting aromatic polyisocyanate with between about 0.1 and about 0.5 hydroxyl equivalent of polyol per equivalent of said polyisocyanate, said polyol comprising at least about 60 percent of a polyol mixture prepared by the transesterification with a glycol of molecular weight from about 60 to about 400 of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. The reaction of polyisocyanate and polyol takes place in the presence of:

(a) isocyanate trimerization catalyst;
(b) fluorocarbon blowing agent; and
(c) between about 0.1 and about 15 wt % based on total polyol or amide diol of the formula

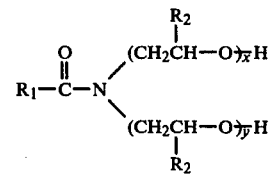

wherein $R_1$ is an alkyl group containing from 8 to about 30 carbon atoms, each $R_2$ is independently H or $CH_3$, and $x+y$ is an integer from 2 to about 50.

Reaction mixture of the invention comprises:
(a) fluorocarbon blowing agent;
(b) isocyanate trimerization catalyst;
(c) polyol comprising at least about 60 percent polyol mixture prepared by the transesterification with a glycol of molecular weight from about 60 to about 400 of residue remaining after dimethyl terephthalate and methyl p-toluate have been removed from dimethyl terephthalate esterified oxidate reaction product, the major portion of said residue comprising a mixture of methyl and benzyl esters of benzene and biphenyl di- and tricarboxylic acids; and
(d) between about 0.1 and about 15 wt % based on total polyol of amide diol of the formula

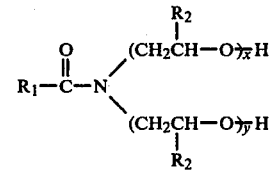

wherein $R_1$ is an alkyl group containing from 8 to about 30 carbon atoms, each $R_2$ is independently H or $CH_3$, and $x+y$ is an integer from 2 to about 50.

DETAILED DESCRIPTION OF THE INVENTION

Alkoxylated alkyl amines used in the present invention have the general formula

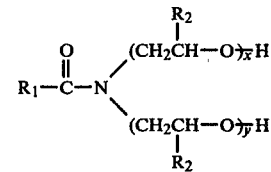

wherein R₁ represents an alkyl group containing from 8 to about 30 carbon atoms, each R₂ is independently H or CH₃ and x+y is an integer from 2 to about 50. Amides or mixtures of amides of this type in which R₁ represents an alkyl group containing between about 12 and about 20 carbon atoms and in which x+y equals an integer between 2 and about 10 are preferred. Amides are used in the invention in amounts of between about 0.1 and about 15 weight percent (wt %), preferably between about 1 and about 6 wt %, based on total polyol used. Since the amides used in the invention are themselves polyols they must be considered in determining the total polyol content of the reaction mixture or rigid foam of the invention.

Amide diols of the general type used in the invention and their preparation are described in detail in U.S. Pat. No. 4,246,364 the disclosure of which is incorporated herein by reference. Such amides can for instance be prepared by converting the appropriate acids to the corresponding fatty acid amides and then reacting the amides with ethylene oxide or propylene oxide or mixtures thereof. Ethylene or propylene oxide is usually used in amounts between about 2 and about 30 moles of ethylene oxide or propylene oxide per molar proportion of acid amide. Suitable acids from which amide diols for use in the invention may be derived include for instance caprylic, capric, lauric, myristic, palmitic, stearic, decylenic, dodecylenic, palmitoleic, oleic, linoleic, and mixtures thereof such as fatty acid mixtures derived from coconut oil (typically a mixture of 8.0% caprylic, 7.0% capric, 48.0% lauric, 17.5% myristic, 8.2% palmitic, 2.0% stearic, 6.0% oleic, and 2.5% linoleic; fatty acid mixtures from soybean oil (typically a mixture of 6.5% palmitic, 4.2% stearic, 33.6% oleic, 52.6% linoleic, and 2.3% linolenic; and fatty acid mixtures from tallow (typically a mixture of 2% myristic, 32.5% palmitic, 14.5% stearic, 48.3% oleic, and 2.7% linoleic). Further illustrative of the starting acids are the halogenated fatty acids, particularly the chlorinated and brominated fatty acids, particularly the chlorinated and brominated fatty acids, which illustratively, can be made by the chlorination or bromination of the coconut, soybean, and tallow fatty acid mixtures described above. Fatty acid mixtures from tallow are especially preferred.

As mentioned polyol is used in foams of the invention in amounts between about 0.1 and about 0.5 hydroxyl equivalent of total polyol per equivalent of polyisocyanate. Use of between about 0.15 and about 0.25 hydroxyl equivalent of polyol on the same basis is frequently preferred. Polyol used in forming reaction mixture and foam of the invention comprises at least about 60 wt%, preferably at least about 75 wt%, and still more preferably at least about 95 wt% of polyol mixture prepared by transesterification with a glycol of molecular weight from about 60 to about 400 of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. Such polyol mixtures are described in detail in U.S. Pat. No. 4,237,238 the disclosure of which is incorporated herein by reference.

The transesterified polyol mixture may be prepared by heating the residue defined above with the transesterifying glycol in accordance with the procedures described in U.S. Pat. No. 3,647,759 the disclosure of which is also incorporated herein by reference.

The transesterifying step is simply the replacement of the non-hydroxyl containing carbomethoxy groups in the various aromatic esters of the residue by the glycol agents so that the ester groups now contain, for the most part, terminal hydroxyl groups. Illustrative of the esterifying glycols which can be employed are ethylene glycol, 1,3-propylene glycol, 1,2-propylene glycol, 1,4-butanediol, 1,2-hexanediol, 1,6-hexanediol, diethylene glycol, dipropylene glycol, tripropylene glycol, polyoxyethylene glycols, and polypropylene glycols. A preferred group of glycols consists of ethylene glycol and diethylene glycol with the latter being most preferred.

Examples of ethylene glycol and diethylene glycol transesterified residues which are used in accordance with the present invention are those produced commercially under the tradename of Terate ® resins and supplied by Hercules Inc., Wilmington, Del. Polyol viscosity sometimes requires adjustment or modification in order to balance component pumping ratios or to satisfy some other processing requirement. Although the polyol mixtures can be readily produced as fluid materials, particularly by employing excess glycol transesterifying agent and leaving residual glycol in the resin, it is also feasible to employ additional diluents with the polyol mixtures.

As mentioned the polyol mixtures described above must comprise at least about 60 wt % and preferably at least about 75 wt % of the total polyol content of reaction mixtures and foams of the invention. The remaining polyol content, if any, of reaction mixtures and foams of the invention may be any polyol of the type conventionally used in making rigid polyurethane and polyisocyanurate foams. Suitable polyols include for instance those mentioned in U.S. Pat. No. 4,094,869 the disclosure of which is incorporated herein by reference.

Polyisocyanate suitable for use in forming foams of the invention may be any of the conventional aromatic polyisocyanates known for use in the manufacture of polyurethane foams or may be mixtures of such polyisocyanates. Suitable polyisocyanates generally have at least two isocyanate groups per molecule and include, for instance, the aromatic polyisocyanates described in more detail in U.S. Pat. No. 4,094,869, the disclosure of which is incorporated herein by reference. Preferred polyisocyanates are methylene bridged isocyanates of the type described in U.S. Pat. No. 4,094,869. These preferred polymethylene polyphenyl polyisocyanates are characterized by the general formula:

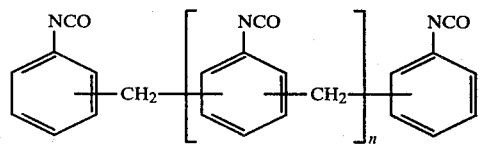

wherein n is predominantly an integer of 1 or 0 or a mixture wherein n is primarily 1 in a preferred embodiment and to a lesser extent 0, and thus the trimer, dimer or mixtures thereof, and where as preferred, this isocyanate is used in an undistilled state, will include residual or trace amounts of high polymers as well. The average isocyanate functionality of these polymers is consequently in the range of about 2.25 to about 3.2 or higher. The polyphenyl polymethylene polyisocyanates thus employed are available commercially, for example, under the tradenames Mondur MR, PAPI and AFPI. They are liquid and have a reduced viscosity of about 50-500 centipoises at 25° centigrade (C.).

Preferred polyisocyanates as described herein may be obtained by phosgenation of mixtures of the corresponding methylene-bridged polyphenyl polyamines. The latter are secured by the hydrochloric-acid catalyzed condensation of primary aromatic amines such, illustratively, as aniline, using procedures well known in the art.

The isocyanate trimerization catalyst employed in the invention can be any catalyst known to those skilled in the art which will catalyze the trimerization of an organic isocyanate compound to form the isocyanurate moiety. Trimerization catalyst is usually used in amounts between about 0.1 and about 5 wt% based on polyisocyanate. Most commonly used trimerization catalysts also function to catalyze the reaction of polyol and isocyanate to form urethane. The use of such dual function catalysts is preferred, but a separate catalyst may if desired be used for urethane formation. If used, urethane catalyst is normally used in amounts between about 0.05 and 3 wt% based on polyisocyanate. Suitable dual function catalysts include for instance one or more metal carboxylates such as potassium acetate, potassium octoate, sodium octoate or calcium octoate. Mixtures of such carboxylates with tertiary amines are also suitable as are N-hydroxyl-alkyl quaternary ammonium carboxylates. Suitable urethane catalysts include for instance tertiary amines such as triethyl amine or dimethyl ethanol amine as well as 1,4-diaza dicyclo-octane (2,2,2) and organo tin compounds such as dibutyltin diacetate, stannous octoate and dibutyltin dilaurate.

Fluorocarbon blowing agent is normally used in amounts between about 5 and about 50 wt%, preferably between about 10 and about 35 wt% based on polyisocyanate with the amount used depending largely upon the desired foam density. The amount used will affect foam density and closed cell content of the foam. This will usually result in blowing agent being present in reaction mixture of the invention in amounts between about 15 and about 175 wt% based on total polyol. Trichlorofluoromethane is preferred. Other suitable blowing agents include for instance dichlorodifluoromethane, 1,1-dichloro-1-fluoroethane, hexafluorocyclobutene and octafluorocyclobutane.

Foaming agents and other optional additives such as dispersing agents, cell stabilizers, surfactants, flame retardants, and the like, can be employed according to the teachings of the patents referred to above. Use of flame retardants tends to even further improve compatibility of the polyols and blowing agents used in accordance with the invention. In this respect suitable flame retardants include tris(dichloropropylphosphate) is a preferred flame retardant for use in the invention.

A conventional surfactant such as a silicone surfactant is preferably incorporated in the reaction system of the invention in amounts between about 0.5 and about 3 wt% based on isocyanate in order to stabilize, in conjection with the catalyst present, the cellular foam product. Illustrative of these are the polyoxalkylenepolydimethyl-siloxane block copolymers. Other nonionic, cationic, and anionic surface active agents may also be used.

The proportion of isocyanate groups to hydroxyl groups in the reactant polyols described above (and thus including the unhalogenated, halogenated and, where present, nitrogen-containing, polyols) is desirably from 2 to 10, and preferably 4 to 7, to 1, respectively. Thus the polyisocyanates are employed in amounts that provide from 200 to 1000, and preferably 400 to 700, percent of the stoichiometric amount of the isocyanate groups required to react with all of the hydroxyl groups present in the reactant polyols. Expressed in an alternative manner, reaction mixture and rigid foams of the invention comprise between about 0.1 and about 0.5 and preferably between about 0.15 and about 0.25 hydroxyl equivalent of polyol per equivalent of polyisocyanate. However expressed, it is critical to the invention that more than fifty percent of the isocyanate groups of the polyisocyanate reactant be free to react and form triazanone moieties within the foam structure.

Reaction mixture of the invention may be formed by mixing the required ingredients of the foam (except for the polyisocyanate) in any suitable manner such as by introducing all of the ingredients into a suitable container or receptical and stirring or blending to obtain a relatively stable, homogeneous mixture. The ingredients may be introduced sequentially or simultaneously. Polyisocyanate is then added to initiate the reactions necessary to make rigid foams of the invention. Reaction mixture of the invention may for instance be combined with polyisocyanate immediately prior to or simultaneously with the dispensing of the mixture onto a moving conveyor belt to foam the mixture to form rigid foam which may be post cured, all in a conventional manner. Post curing is generally carried out in the absence of moisture at ambient or, if desired to accelerate the cure, at elevated temperatures, the permissible range being desirably about 20° C. to 90° C. for periods of time which will vary inversely with the curing temperature employed and varying from about 1 to about 48 hours. This post cure serves to complete the formation substantially of trimer within the foam structure.

Because of the improved compatibility between ingredients due to the presence of the amide diol, reaction mixture of the invention has greatly improved stability. Depending upon such factors as storage temperature, amount of agitation during storage, presence of surfactant or flame retardant and amounts and type of polyols and amide diol used, reaction mixtures of the invention will remain homogeneous with no noticeable separation of blowing agent for periods of time ranging from a few minutes to almost indefinitely. In many instances reaction mixture of the invention will remain stable and homogeneous for at least about 10 minutes. This allows the mixtures to be completely formed and then stored for at least a short time before use. By contrast, in reaction mixtures of this general type taught by the prior art, e.g. U.S. Pat. No. 4,237,238, the fluorocarbon blowing agent begins to separate almost immediately so that uneven foam results if the mixture is not used immediately.

The following example is intended to illustrate the invention without limiting the scope thereof.

EXAMPLE

Rigid foam of the invention may be made in a conventional manner from reaction mixture of the invention comprising the following ingredients:

| Ingredient | Parts by Weight |
|---|---|
| Terate ® 203 polyol | 100 |
| Trichlorofluoromethane blowing agent | 92.5 |

-continued

| Ingredient | Parts by Weight |
| --- | --- |
| Tris(dichloropropylphosphate) flame retardant | 35.5 |
| N—(hydroxyalkyl) quarternary ammonium carboxylate catalyst | 5.0 |
| Silicone surfactant (Dow Corning DC-193) | 5.8 |
| Amine diol compatability agent having the structure | 2.5 |

$$R_1-\overset{O}{\underset{\|}{C}}-N\diagup^{(CH_2CH_2-O)_{\overline{x}}H}_{(CH_2CH_2-O)_{\overline{y}}H}$$

where $x+y=5$ and $R_1$ is a mixture of alkyl groups averaging about 18 carbon atoms.

Terate ®203 polyol is supplied by Hercules, Inc., and consists entirely of polyol mixture prepared by the transesterification with a glycol of molecular weight from about 60 to about 400 of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids.

To the above reaction mixture may be added 332 parts by weight of polymethylene polyphenyl polyisocyanate having an isocyanate equivalent of 425 (obtainable from Mobay Chemical Company under the tradename Mondur ®MR). The resulting mixture may then be immediately heated and dispensed onto a moving conveyor belt to product rigid foam in a conventional manner.

While the invention has been described above with respect to preferred embodiments thereof, it will be understood by those skilled the art that various changes and modifications may be made without departing from the spirit or scope of the invention.

What is claimed is:

1. Rigid cellular polyisocyanurate foam comprising the post cured reaction product of reacting aromatic polyisocyanate with between about 0.1 and about 0.5 hydroxyl equivalent of polyol per equivalent of said polyisocyanate, said polyol comprising at least about 60 percent polyol mixture prepared by the transesterification with a glycol of molecular weight from about 60 to about 400 of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids, said reaction of polyisocyanate and polyol taking place in the presence of:
   (a) isocyanate trimerization catalyst;
   (b) fluorocarbon blowing agent; and
   (c) between about 0.1 and about 15 wt% based on total polyol of amine diol of the formula $$R_1-\overset{O}{\underset{\|}{C}}-N\diagup^{(CH_2\overset{R_2}{\underset{|}{C}}H-O)_{\overline{x}}H}_{(CH_2\underset{\underset{R_2}{|}}{C}H-O)_{\overline{y}}H}$$

wherein $R_1$ is an alkyl group containing from 8 to about 30 carbon atoms, each $R_2$ is independently H or $CH_3$, and $x+y$ is an integer from 2 to about 50.

2. Rigid foam according to claim 1 wherein, in the formula for the amide diol, $R_1$ represents an alkyl group containing between about 12 and about 20 carbon atoms and $x+y$ equals an integer between 2 and about 10.

3. Rigid foam according to claim 1 wherein total polyol is present in amounts sufficient to supply between about 0.15 and about 0.25 hydroxyl equivalent of polyol per equivalent of polyisocyanate.

4. Rigid foam according to claim 1 wherein said polyol prepared by transesterification of residue comprises at least about 75 percent of the total polyol.

5. Rigid foam according to claim 1 wherein the aromatic polyisocyanate comprises polymethylene polyphenyl polyisocyanate characterized by the general formula:

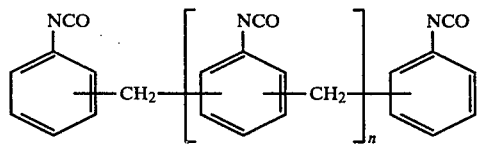

wherein n is predominantly an integer of 1 or 0.

6. Rigid foam according to claim 1 wherein the blowing agent is trichlorofluoromethane.

7. Rigid foam according to claim 1 wherein amide diol is present in an amount between about 1 and about 6 wt% based on total polyol.

8. Rigid foam according to claim 1 wherein said blowing agent is present in an amount between about 5 and about 50 wt% based on polyisocyanate.

9. Rigid foam according to claim 1 wherein said polyol prepared by transesterification of residue comprises at least about 95 percent of the polyol in said mixture.

10. Rigid foam according to claim 1 wherein said blowing agent is present in an amount between about 10 and about 35 wt% based on polyisocyanate.

11. Rigid foam according to claim 1 wherein:
   (a) in the formula for the amide diol, $R_1$ represents an alkyl group containing between about 12 and about 20 carbon atoms and $x+y$ equals an integer between 2 and about 10;
   (b) polyol is used in amounts sufficient to supply between about 0.15 and about 0.25 hydroxyl equivalent of polyol per equivalent of polyisocyanate;
   (c) said polyol prepared by transesterification of residue comprises at least about 95 percent of the total polyol;
   (d) the aromatic polyisocyanate comprises polymethylene polyphenyl polyisocyanate characterized by the general formula:

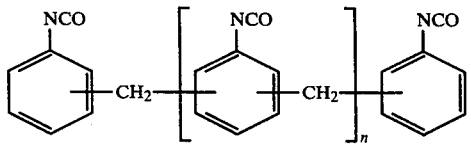

wherein n is predominantly an integer of 1 or 0;
(e) amide diol is present in an amount between about 1 and about 6 wt% based on total polyol; and
(f) the blowing agent is trichlorofluoromethane and is present in an amount between about 10 and about 35 wt% based on polyisocyanate.

12. Reaction mixture comprising:
(a) fluorocarbon blowing agent;
(b) glycol comprising at least about 60 percent polyol mixture prepared by the transesterification with a glycol of molecular weight from about 60 to about 400 of residue remaining after dimethyl terephthalate and methyl p-toluate have been removed foam dimethyl terephthalate esterified oxidate reaction product, the major portion of said residue comprising a mixture of methyl and benzyl esters of benzene and biphenyl di- and tricarboxylic acids; and
(c) between about 0.1 and about 15 pounds per hundred pounds total polyol of amide diol of the formula

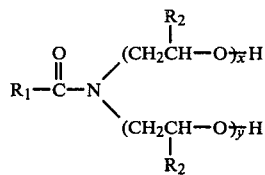

wherein $R_1$ is an alkyl group containing from 8 to about 30 carbon atoms, each $R_2$ is independently H or $CH_3$, and $x+y$ is an integer from 2 to about 50.

13. Reaction mixture according to claim 12 wherein, in the formula for the amide diol, $R_1$ represents an alkyl group containing between about 12 and about 20 carbon atoms and $x+y$ equals an integer between 2 and about 10.

14. Reaction mixture according to claim 12 wherein said polyol prepared by transesterification of residue comprises at least about 75 percent of the polyol in said mixture.

15. Reaction mixture according to claim 12 wherein the aromatic polyisocyanate comprises polymethylene polyphenyl polyisocyanate characterized by the general formula:

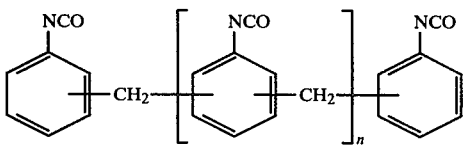

wherein n is predominantly an integer of 1 or 0.

16. Reaction mixture according to claim 12 wherein the blowing agent is trichlorofluoromethane.

17. Reaction mixture according to claim 12 wherein the amide diol is present in an amount between about 1 and about 6 pounds of amide diol per hundred pounds of total polyol.

18. Reaction mixture according to claim 12 wherein said polyol prepared by transesterification of residue comprises at least about 95 percent of the polyol in said mixture.

19. Reaction mixture according to claim 12 wherein the blowing agent is trichlorofluoromethane and is present in an amount between about 15 and about 175 wt% based on polyol.

20. Reaction mixture according to claim 12 wherein:
(a) in the formula for the amide diol, $R_1$ represents an alkyl group containing between about 12 and about 20 carbon atoms and $x+y$ equals an integer between 2 and about 10;
(b) said polyol prepared by transesterification of residue comprises at least about 95 percent of the polyol in said mixture;
(c) the amide diol is present in an amount between about 1 and about 6 wt% based on total polyol; and
(d) the blowing agent is trichlorofluoromethane and is present in an amount between about 15 and about 175 wt% based on total polyol.

* * * * *